(12) United States Patent
Elmose

(10) Patent No.: US 11,384,728 B2
(45) Date of Patent: Jul. 12, 2022

(54) WIND TURBINE ROTOR BLADE PITCH BEARING

(71) Applicant: Siemens Gamesa Renewable Energy A/S, Brande (DK)

(72) Inventor: Soeren Forbech Elmose, Bording (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 16/929,595

(22) Filed: Jul. 15, 2020

(65) Prior Publication Data

US 2021/0017955 A1    Jan. 21, 2021

(30) Foreign Application Priority Data

Jul. 19, 2019    (EP) .................................... 19187196

(51) Int. Cl.
| | | |
|---|---|---|
| *F03D 80/70* | (2016.01) | |
| *F03D 80/50* | (2016.01) | |
| *F03D 1/06* | (2006.01) | |
| *F03D 7/02* | (2006.01) | |

(52) U.S. Cl.
CPC ......... *F03D 1/0658* (2013.01); *F03D 7/0224* (2013.01); *F03D 80/50* (2016.05); *F03D 80/70* (2016.05); *F05B 2260/79* (2013.01)

(58) Field of Classification Search
CPC ............................... F03D 1/0658; F03D 80/70
See application file for complete search history.

(56) References Cited

U.S. PATENT DOCUMENTS

| | | | |
|---|---|---|---|
| 5,653,582 A | 8/1997 | Harvey et al. | |
| 8,172,531 B2* | 5/2012 | Wadehn | F16C 32/0644 416/27 |
| 8,936,397 B2* | 1/2015 | Pedersen | F16C 17/02 384/282 |
| 9,657,716 B2* | 5/2017 | Vervoorn | F03D 7/0228 |

(Continued)

FOREIGN PATENT DOCUMENTS

| | | |
|---|---|---|
| EP | 2511521 A1 | 10/2012 |
| JP | H09166132 A | 6/1997 |

(Continued)

OTHER PUBLICATIONS

European Search Report dated Jan. 31, 2020 for Application No. 19187196.1.

(Continued)

*Primary Examiner* — Justin D Seabe
(74) *Attorney, Agent, or Firm* — Schmeiser, Olsen & Watts LLP

(57) ABSTRACT

Provided is a wind turbine rotor blade pitch bearing for mounting a rotor blade to a hub, including a carrier with an annular arrangement of bearing pad seats; a plurality of bearing pads, wherein a bearing pad is arranged in each bearing pad seat of the carrier; and a gripping assembly for gripping the carrier, which gripping assembly including a sliding part arranged to lie against an annular arrangement of bearing pads and further includes an access window dimensioned to expose a bearing pad when opened. A wind turbine with a number of such pitch bearings; and a method of performing a service routine on a wind turbine rotor blade pitch bearing is further provided.

13 Claims, 3 Drawing Sheets

(56) References Cited

U.S. PATENT DOCUMENTS

| | | | |
|---|---|---|---|
| 9,995,283 B2 | 6/2018 | Stiesdal | |
| 2011/0042618 A1 | 2/2011 | Strano et al. | |
| 2011/0142618 A1* | 6/2011 | Moore | ............ F03D 80/00 415/229 |
| 2011/0188988 A1 | 8/2011 | Wadehn | |
| 2012/0099993 A1 | 4/2012 | Guerenbourg et al. | |
| 2013/0302175 A1 | 11/2013 | Munk-Hansen | |
| 2015/0017000 A1 | 1/2015 | Sato et al. | |
| 2017/0067438 A1 | 3/2017 | Ebbesen et al. | |

FOREIGN PATENT DOCUMENTS

| | | |
|---|---|---|
| JP | 2003269553 A | 9/2003 |
| JP | 2005282389 A | 10/2005 |
| JP | 5650210 B2 | 1/2015 |
| JP | 5880707 B2 | 3/2016 |

OTHER PUBLICATIONS

Japanese Office Action for Application No. 2020-122942, dated May 10, 2021.

* cited by examiner

WIND TURBINE ROTOR BLADE PITCH BEARING

CROSS-REFERENCE TO RELATED APPLICATIONS

This application claims priority to EP Application No. 19187196.1, having a filing date of Jul. 19, 2019, the entire contents of which are hereby incorporated by reference.

FIELD OF TECHNOLOGY

The following describes a wind turbine rotor blade pitch bearing, and a method of performing a service routine on a wind turbine rotor blade pitch bearing.

BACKGROUND

A rotor blade of a wind turbine may be mounted to the hub by means of a pitch system, which allows the rotor blade to be turned about its longitudinal axis. A wind turbine with such rotor blades can extract more energy from the wind.

There are various ways of constructing a pitch system. An important aspect is the choice of bearing. The load on the pitch bearings can be significant, particularly with the trend towards very long (and therefore heavy) rotor blades. A pitch system can be realized as a roller-element bearing, a plain bearing, etc.

For various reasons, a plain bearing (or "sliding bearing") comprising an annular arrangement of bearing pads is suitable for use in a rotor blade pitch system. The bearing pads must ensure free motion of the journal or rotating part (usually the rotor blade) relative to the sleeve or stationary part (usually the hub) and must be able to withstand the high loads that can occur.

Wind turbines are often installed in remote or offshore locations, so that service routines are expensive. Furthermore, maintenance procedures for a pitch bearing can be hazardous and time-consuming, for example if the bearing can only be accessed from the outside or from the cramped interior space inside the hub. Therefore, much effort is invested in designing such bearings to significantly extend the intervals between maintenance procedures, for example by designing the bearings to have a long lifetime.

One way of doing this is to design the bearings so that these wear down only slowly over time. For example, bearing pads may be made of a robust polymer, or at least have outer faces comprising a robust polymer material. A conventional sliding bearing that is designed for a long lifetime (i.e. long intervals between service routines) may use a thermoplastic polymer such as PEEK (polyether ether ketone). Another way of prolonging the lifetime of a bearing pad is to include reinforcing material such as embedded glass fiber or carbon fiber. However, such bearing pads are costly. A wind turbine with three rotor blades, each with a diameter of several meters at its root end, could require hundreds of such bearing pads, so that bearing would present a significant cost factor.

Even if the bearing pads are characterized by a long lifetime, at some point during the wind turbine lifetime it may be necessary to exchange the bearing pads. Therefore, a pitch bearing must permit access in some way to the interior. It is known to construct a rotor blade pitch bearing so that an annular or disc-shaped housing part can be removed to expose the bearing pads. However, the diameter of any such housing part—at the root end of a long rotor blade—is correspondingly large. It may be difficult and hazardous to manipulate such a heavy and unwieldy component in the confined space of a wind turbine hub, so that a service routine is time-consuming and expensive.

SUMMARY

An aspect relates to provide a more economical rotor blade pitch bearing design.

According to embodiments of the invention, a wind turbine rotor blade pitch bearing comprises a carrier with an annular arrangement of bearing pad seats about its perimeter; a plurality of bearing pads, wherein a bearing pad is arranged in each bearing pad seat; and a gripping assembly for gripping the carrier, which gripping assembly comprises a sliding part arranged to lie against an annular arrangement of bearing pads and further comprises an access window dimensioned to expose a bearing pad when opened. The sliding part is arranged to slide relative to the pad carrier when the pitch system is actuated and shall be understood to comprise a low-friction contact surface that lies against an annular arrangement of bearing pads.

The pad carrier can be in the form of a disc or ring, depending on how the pitch bearing is realized. The bearing pad seats shall be understood to be arranged in an annular fashion about the perimeter of the pad carrier, e.g. near its outer circumference. Embodiments of the invention make use of the fact that the sliding part is arranged to slide relative to the pad carrier when the pitch system is actuated. By providing an access window in a sliding part, it is possible to access a bearing pad. Since a bearing pad can be accessed with relative ease, the design parameters of the bearing can be adjusted to favor a more frequent replacement instead of favoring a long lifetime. This means that the pitch bearing can be manufactured to use more economical bearing pads. The savings may be significant, particularly in the case of a pitch system for a rotor blade with a root end diameter in the order of 5 m or more, since the bearings of such rotor blade pitch systems may easily require 40-60 bearing pads between the carrier and a sliding part.

According to embodiments of the invention, a wind turbine comprises a number of rotor blades, each mounted to the hub by means of such pitch bearing, and a pitch system for turning each rotor blade about its longitudinal axis. The pitch system may be assumed to comprise a pitch drive that is realized to turn a sliding part relative to the carrier, i.e. to turn the rotor blade relative to the hub.

According to embodiments of the invention, the method of performing a service routine on such a rotor blade pitch bearing comprises the steps of opening an access window of a sliding part; actuating the pitch system to turn the sliding part relative to the carrier until a specific bearing pad appears in the opened access window; inspecting and/or replacing the bearing pad; and closing the access window.

An advantage of the inventive method is that a bearing pad can be accessed with relatively little effort. For example, the rotor blade being serviced may be brought into the six o'clock position (pointing downwards). A service technician may enter the hub and open an access window in a sliding part of that pitch bearing. The service technician can then initiate a pitch control sequence that results in the pitch bearing being actuated until a bearing pad appears in the opening. The service technician can repeat this sequence in order to visually inspect each bearing pad, for example. Alternatively, if it is already suspected that a bearing pad is damaged or worn, the control sequence can be used to access the damaged or worn bearing pad for replacement.

The terms "plain bearing", "journal bearing" and "sliding bearing" may be used interchangeably in the following. In the following, without restricting embodiments of the invention in any way, it may be assumed that the bearing pads are simply made of nylon, without any reinforcing material. Such bearing pads are very economical and can considerably reduce overall costs for a wind turbine that requires hundreds of bearing pads for its rotor blade pitch bearings. The relatively short lifetime of such nylon bearing pads is not a drawback, since the inventive pitch bearing allows easy access for maintenance and replacement.

A sliding part of the pitch bearing may be annular or disc-shaped, depending on the design of the pitch system. Similarly, the pad carrier may be annular or disc-shaped, depending on the design of the pitch system.

In a particularly preferred embodiment of the invention, the carrier comprises a first face (e.g. oriented towards the hub) and a parallel second face (e.g. oriented towards the rotor blade), and an annular arrangement of bearing pad seats in each face. The pitch bearing has a first sliding part arranged to lie against the bearing pads of the first carrier face and a second sliding part arranged to lie against the bearing pads of the second carrier face. In this preferred embodiment, the pitch bearing has a first set of bearing pads arranged in the bearing pad seats of the first carrier face and a second set of bearing pads arranged in the bearing pad seats of the second carrier face. The sliding parts and the carrier may be understood to be parallel to each other. The arrangement of sliding rings and carrier is mounted at the interface between rotor blade root and hub.

To provide a desired structural strength to the pitch bearing, a spacer ring is arranged between the first sliding ring and the second sliding ring, and the sliding rings and spacer are realized as a single unit or entity. The spacer ring can be formed in one piece with a sliding ring. Alternatively, the spacer ring may be bolted and/or welded into place between the two sliding rings.

Any number of access windows may be provided in a sliding part. In a preferred embodiment of the invention, however, a single access window is provided in a sliding ring. This embodiment is most economical to realize. The access window may be dimensioned to expose one or more entire bearing pads. For example, an access window may be dimensioned to expose two adjacent bearing pads. Alternatively, a sliding ring can have two diametrically opposed access windows so that two diametrically opposed bearing pads can be exposed simultaneously. However, it may be preferable to restrict the size of any opening in the sliding ring to a minimum in order to not compromise the structural strength of the sliding ring. Therefore, in a preferred embodiment of the invention, a sliding ring has only one access window that is dimensioned to expose a single bearing pad.

In a preferred embodiment of the invention, the access window is shaped according to the shape of the bearing pads that are used in the bearing. The outline of the access window is slightly larger than the outline of the bearing pad in order to facilitate removal and insertion steps. A bearing pad may be arc-shaped, so that a set of such bearing pads collectively forms an annulus. In this case, the access window of a sliding ring may also be arc-shaped. Equally, a bearing pad may have a simple rectangular shape. In this case, the access window of a sliding ring also has a simple rectangular shape.

The access window can be realized in any suitable manner. In a particularly preferred embodiment of the invention, the access window comprises a suitably shaped opening as explained above, and a cover that is shaped to fit essentially exactly in the opening when the access window is shut or closed. The cover may be hinged along one edge, in the manner of a window or door, or may be completely detachable in the manner of a manhole cover or hatch, and can be secured with one or more pins, magnets, hooks or latches, for example. The terms "access window", "access door" and "access hatch" may be used interchangeably herein.

The access window opening can have tapered and/or stepped side walls, with correspondingly shaped edges about the access window itself. In this way, it is ensured that the access window lies flush with the interior surface of the sliding part and cannot extend into the inner space of the bearing.

In a rotor blade pitch system, the rotor blade is turned about its longitudinal axis. This is generally achieved by using a pitch drive unit that has a pinion arranged to engage with an annular toothed ring. The pitch drive unit can be mounted on the stationary part of the system, or on the rotatory part of the system. For example, the pitch drive unit can be mounted to the hub, and the annular toothed ring may be mounted about the rotor blade root end. Alternatively, the pitch drive unit can be mounted in the root end of the rotor blade, and the annular toothed ring may be mounted about a circular opening of the hub. Various modifications of such systems are possible, as will be known to the skilled person.

In one embodiment, the carrier is mounted over the root end of the rotor blade. Depending on how the pitch drive unit and toothed ring are realized, the carrier may be a plate that closes off the root end of the blade, or it may be annular with a central opening to allow access into the blade interior.

BRIEF DESCRIPTION

Some of the embodiments will be described in detail, with reference to the following figures, wherein like designations denote like members, wherein.

DETAILED DESCRIPTION

Figure 1:
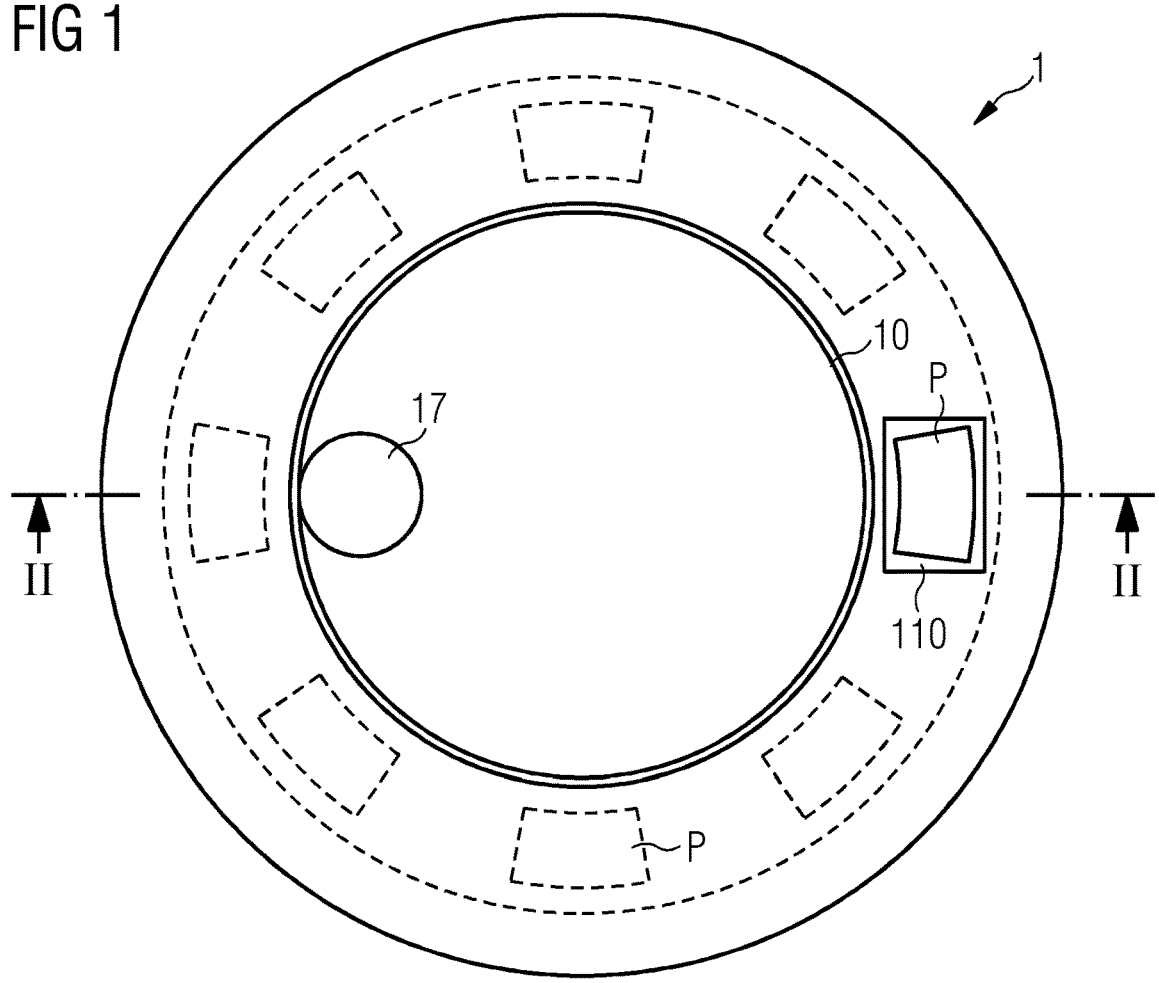
FIG. 1 shows a plan view of an embodiment of the inventive rotor blade pitch bearing.
Figure 2:
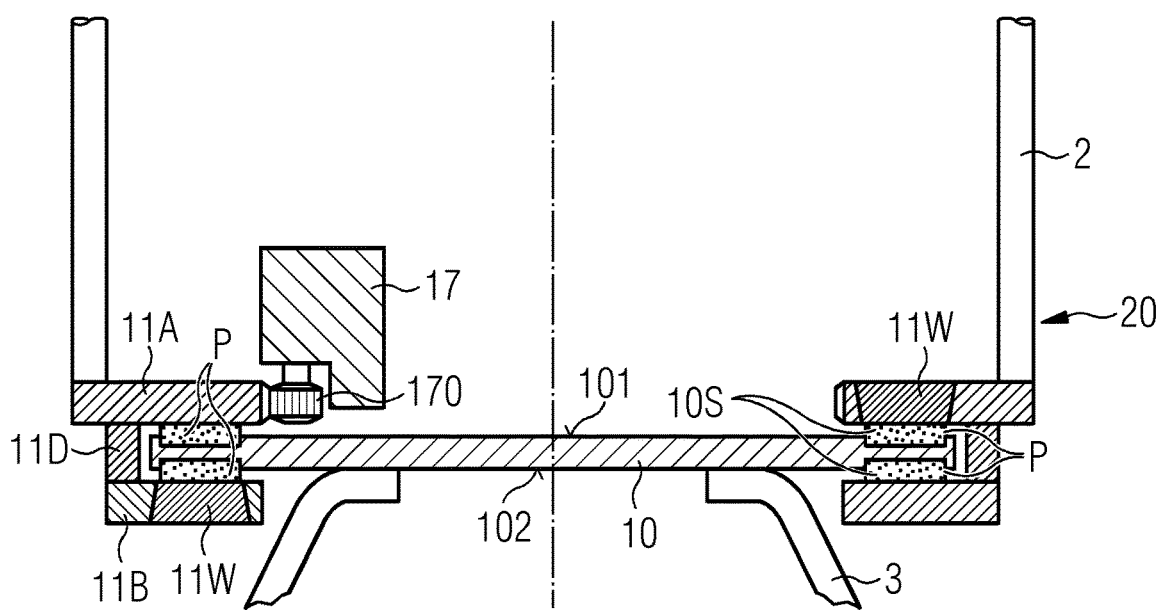
FIG. 2 shows a cross-section through the embodiment of FIG. 1.

FIG. 1 shows a plan view of an embodiment of the inventive rotor blade pitch bearing 1. Here, the viewer is looking in the direction of the hub from a vantage point in the interior of a rotor blade 2. FIG. 2 shows cross-section II-II. A first sliding ring 11A is mounted to the root end 20 of the rotor blade 2, and a spacer or distance ring 11D is placed between the first sliding ring 11A and a second sliding ring 11B. The root end 20, sliding rings 11A, 11B and spacer 11D are connected and act as a single entity.

A disc-shaped pad carrier 10A is mounted to the hub 3. A pitch drive 17 is mounted to the carrier 10 and engages with an annular toothed ring at the inner edge of the first sliding ring 11A to turn the rotor blade 2 about its longitudinal axis L.

FIG. 1 indicates an annular arrangement of bearing pads P set into recesses or seats 10S in the pad carrier 10, and FIG. 2 shows the seats 10S on both faces 101, 102 of the carrier 10. The diagrams also indicate an access window 11W in the first sliding ring 11A and an access window 11W in the second sliding ring 11B. Here, each bearing pad P is arc-shaped, while the access window 11W is essentially rectangular for ease of manufacture. While the diagram only shows a small number of bearing pads for the sake of clarity, it shall be understood that the pitch bearing with a diameter of several meters may avail of many bearing pads, for example 40-60 or more. These may be arranged very close together, unlike the wide spacing shown here.

For the purposes of illustration in FIG. 2, the access windows 11W, 11W are shown to be diametrically opposite, but this is not necessary. Instead, it is advantageous if both access windows 11W are positioned to simultaneously expose an entire bearing pad P.

FIG. 2 shows that an access window opening has tapered or slanting side faces, and corresponding slanted edges along the sides of the access window 11W, so that the access window 11W cannot protrude into the interior of the bearing 1.

Figure 3:
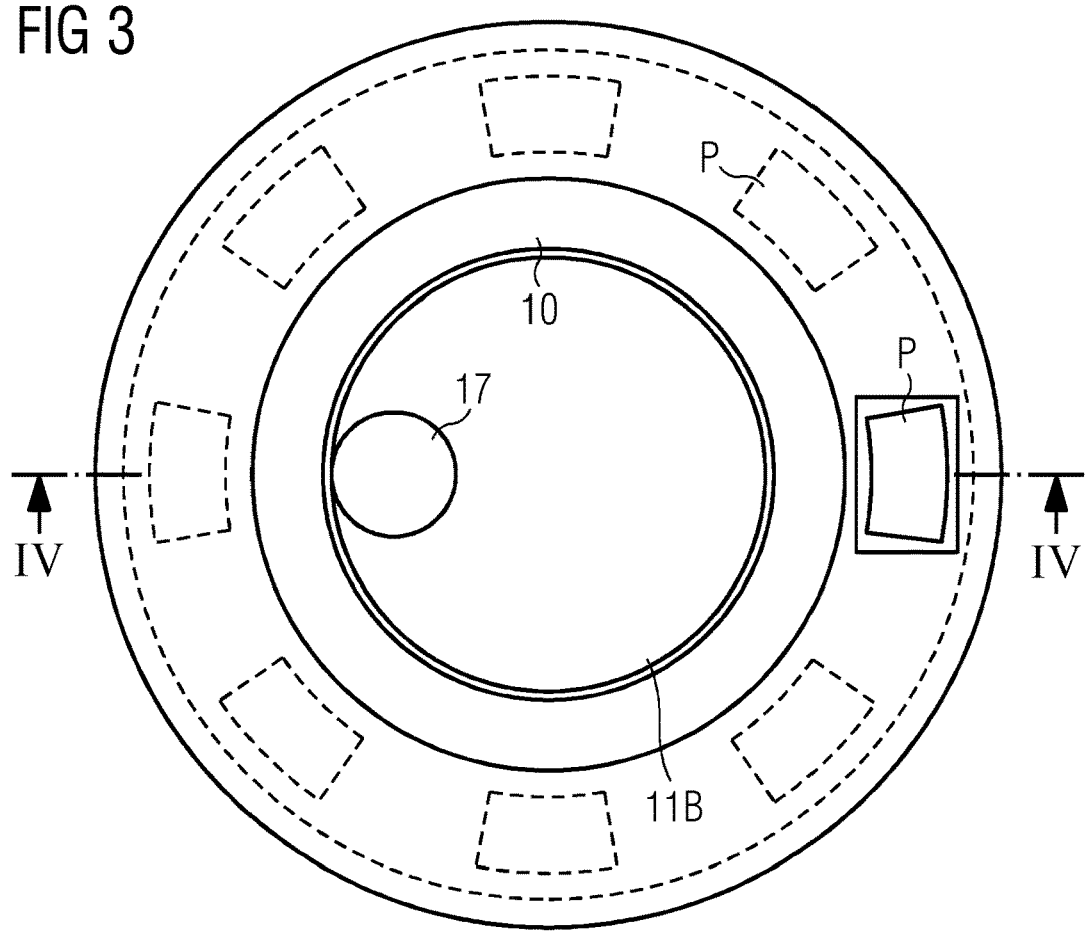
FIG. 3 shows a plan view of a further embodiment of the inventive rotor blade pitch bearing.
Figure 4:
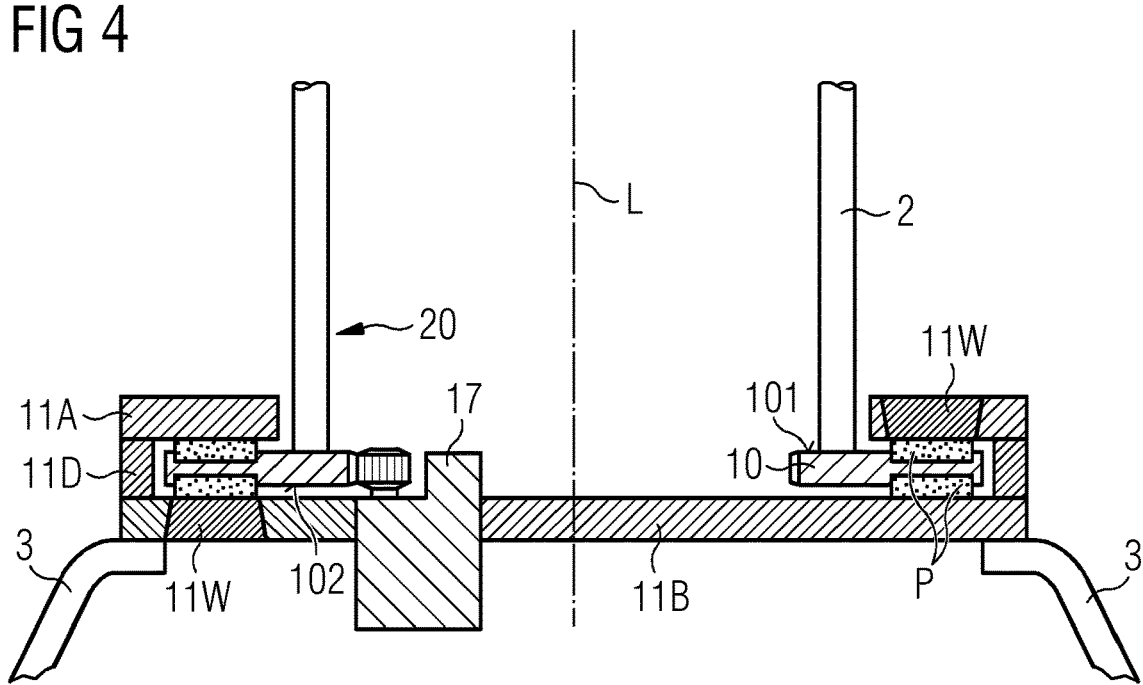
FIG. 4 shows a cross-section through the embodiment of FIG. 3.

FIG. 3 shows a plan view of a further embodiment of the inventive rotor blade pitch bearing 1, and FIG. 4 shows a cross-section IV-IV. Here also, the viewer is looking in the direction of the hub 3 from a vantage point in the interior of a rotor blade 2. In this embodiment, an annular pad carrier 10 is mounted to the root end 20 of the rotor blade 2. The sliding parts 11A, 11B in this embodiment are mounted to the hub 3, again with a spacer or distance ring 11D between. Here, an inner sliding part 11B is disc-shaped and closes off the hub 3. The outer sliding part 11A is annular and extends about the root end 20 of the rotor blade 2. A pitch drive 17 is mounted to the inner sliding part 11A and engages with a toothed ring at the inner edge of the annular pad carrier 10. In this case also, an annular arrangement of bearing pads P is set into recesses or seats 10S on either side 101, 102 of the pad carrier 10, and each sliding part 11A, 11B has an access window 11W to expose an entire bearing pad P.

Figure 5:
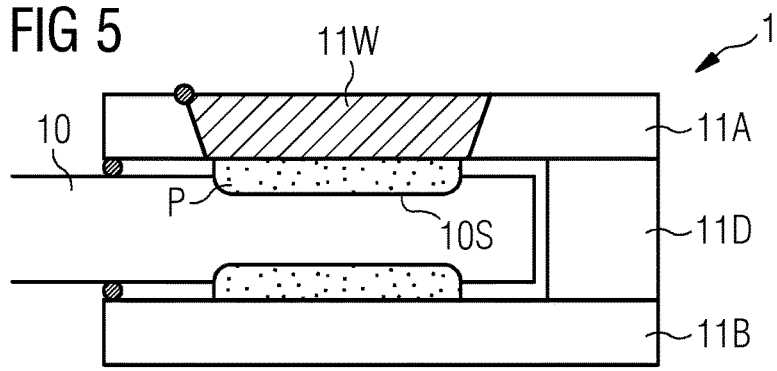
FIG. 5 shows the pitch system has been actuated to move the sliding parts relative to the carrier to align a pad P with an access window.
Figure 6:
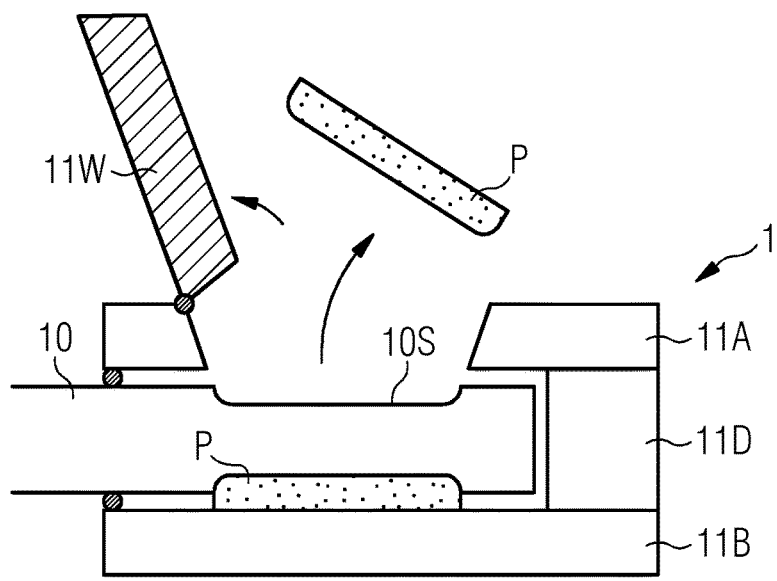
FIG. 6 shows the access window has been opened, and the pad P is removed from its seat in the carrier.
Figure 7:
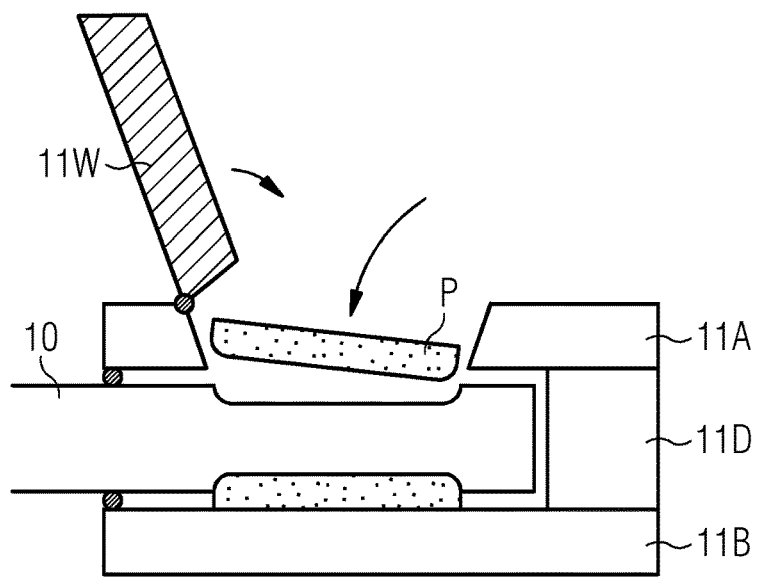
FIG. 7 illustrates exemplary stages in an embodiment of the inventive method.

FIGS. 5-8 illustrate stages in an exemplary service routine. In FIG. 5, the pitch system has been actuated to move the sliding parts 11A, 11B relative to the carrier 10 to align a pad P with an access window 11W. In FIG. 6, the access window 11W has been opened, and the pad P is removed from its seat 10S in the carrier 10. In FIG. 7, a replacement pad P is inserted through the access opening 11W and the access window can be closed again. Of course, before closing the access window 11W, the pitch system can be actuated to align the next pad P with the access window 11W, and the steps can be repeated as often as necessary to inspect and/or replace the desired number of pads P.

Although the present invention has been disclosed in the form of preferred embodiments and variations thereon, it will be understood that numerous additional modifications and variations could be made thereto without departing from the scope of the invention. For example, the pitch bearing may be realized in any suitable manner in addition to the embodiments described above: the pad carrier may be mounted to the rotor blade root end or to the hub; the gripping assembly may extend about an outer circumference of a disc-shaped pad carrier or about an inner circumference of an annular pad-carrier; a pitch drive unit may be mounted inside or outside a rotor blade; etc.

For the sake of clarity, it is to be understood that the use of "a" or "an" throughout this application does not exclude a plurality, and "comprising" does not exclude other steps or elements.

The invention claimed is:

1. A pitch bearing for mounting a rotor blade to the hub of a wind turbine and for allowing the rotor blade to be turned about a longitudinal axis, comprising
   a carrier with an annular arrangement of bearing pad seats positioned on an axial carrier face of the carrier;
   a plurality of bearing pads, wherein a bearing pad is arranged in each bearing pad seat of the carrier such that the plurality of bearing pads are configured in an annular arrangement on the axial carrier face of the carrier; and
   a sliding part arranged to lie against the annular arrangement of bearing pads on the axial carrier face of the carrier, wherein the sliding part is configured to move relative to the carrier and/or is configured such that the carrier moves relative to the sliding part, wherein the sliding part includes an access window positioned in the sliding part, and wherein the access window is dimensioned to expose a respective bearing pad when opened.

2. The pitch bearing according to claim 1, wherein the carrier comprises a first carrier face and a second carrier face opposite the first carrier face, wherein each of the first carrier face and the second carrier face includes at least one bearing pad seat, wherein the plurality of bearing pads include a first set of bearing pads arranged in the at least one bearing pad seat of the first carrier face and a second set of bearing pads arranged in the at least one bearing pad seat of the second carrier face, wherein the sliding part comprises a first sliding part arranged to lie against the bearing pads of the first carrier face and a second sliding part arranged to lie against the bearing pads of the second carrier face, and wherein the first sliding part includes a first access window and the second sliding part includes a second access window.

3. The pitch bearing according to claim 1, wherein a distance ring is arranged between the first sliding part and the second sliding part, and wherein the sliding parts and the distance ring are realized as a single entity.

4. The pitch bearing according to claim 1, comprising a single access window in each sliding part.

5. The pitch bearing according to claim 1, wherein the access window is shaped to fit in an opening formed in the sliding part.

6. The pitch bearing according to claim 5, wherein the opening has tapered side walls.

7. The pitch bearing according to claim 1, wherein the bearing pads are realized as polymer bearing pads.

8. The pitch bearing according to claim 1, wherein the carrier is realized as a stationary component of the pitch bearing and is mounted to the hub.

9. The pitch bearing according to claim 1, wherein the carrier is realized as a rotatory component of the pitch bearing and is mounted over the root end of the rotor blade.

10. A wind turbine comprising a number of rotor blades, wherein each rotor blade is mounted to the hub by a pitch bearing according to claim 1, and a pitch system for turning each rotor blade about its longitudinal axis.

11. The wind turbine according to claim 10, wherein the pitch system comprises a pitch drive unit for each rotor blade, wherein a pitch drive unit comprises a pinion arranged to engage with a toothed ring arranged about a circumference of the rotor blade.

12. A method of performing a service routine on a wind turbine rotor blade pitch bearing having a carrier with an annular arrangement of bearing pad seats positioned on an axial carrier face of the carrier; a plurality of bearing pads, wherein a bearing pad is arranged in each bearing pad seat of the carrier such that the plurality of bearing pads are configured in an annular arrangement on the axial carrier face of the carrier; and a sliding part arranged to lie against the annular arrangement of bearing pads on the axial carrier face of the carrier, wherein the sliding part is configured to move relative to the carrier and/or is configured such that the carrier moves relative to the sliding part, wherein the sliding part includes an access window in the sliding part, and wherein the access window is dimensioned to expose a bearing pad when opened, the method comprising:

opening the access window in the sliding part;

actuating a pitch system to turn the sliding part relative to the carrier until a respective bearing pad of the plurality of bearing pads appears in the opened access window;

at least one of inspecting and replacing the respective bearing pad; and closing the access window.

13. The method according to claim 12, wherein a bearing pad on a first face of the carrier and a bearing pad on a second face of the carrier are at least one of inspected and replaced at one position of the pitch system.

* * * * *